US012034288B2

(12) United States Patent
Hack et al.

(10) Patent No.: US 12,034,288 B2
(45) Date of Patent: Jul. 9, 2024

(54) JUNCTION BOX FOR A LIGHT FIXTURE

(71) Applicant: Tech Lighting LLC, Skokie, IL (US)

(72) Inventors: Tyler Hack, Chicago, IL (US); Sean Lavin, Winnetka, IL (US)

(73) Assignee: Tech Lighting LLC, Skokie, IL (US)

( * ) Notice: Subject to any disclaimer, the term of this patent is extended or adjusted under 35 U.S.C. 154(b) by 371 days.

(21) Appl. No.: 17/388,911

(22) Filed: Jul. 29, 2021

(65) Prior Publication Data

US 2023/0029890 A1  Feb. 2, 2023

(51) Int. Cl.
| | |
|---|---|
| *H02G 3/14* | (2006.01) |
| *F21V 21/04* | (2006.01) |
| *H02G 3/08* | (2006.01) |
| *F21V 23/00* | (2015.01) |

(52) U.S. Cl.
CPC ................ *H02G 3/14* (2013.01); *H02G 3/08* (2013.01); *F21V 21/04* (2013.01); *F21V 23/007* (2013.01)

(58) Field of Classification Search
CPC ........... F21V 21/04; F21V 15/01; H02G 3/14; H02G 3/08; H02G 3/12; F21S 8/04
USPC .......................................................... 220/3.9
See application file for complete search history.

(56) References Cited

U.S. PATENT DOCUMENTS

| | | | | |
|---|---|---|---|---|
| 5,785,409 | A | * | 7/1998 | Reinert, Sr. ............. E01F 9/559 |
| | | | | 362/153.1 |
| 10,612,761 | B1 | * | 4/2020 | Worman ................ F21V 19/004 |
| 2011/0044047 | A1 | * | 2/2011 | Mandy ..................... F21V 21/04 |
| | | | | 362/282 |
| 2012/0140442 | A1 | * | 6/2012 | Woo ....................... F21V 23/006 |
| | | | | 29/829 |
| 2021/0364139 | A1 | * | 11/2021 | Danesh ...................... F21S 8/02 |
| 2023/0055757 | A1 | * | 2/2023 | Kay ......................... H02G 3/14 |

* cited by examiner

*Primary Examiner* — J. Gregory Pickett
*Assistant Examiner* — Niki M Eloshway
(74) *Attorney, Agent, or Firm* — MARSHALL, GERSTEIN & BORUN LLP; Ryan J. Schermerhorn

(57) ABSTRACT

A junction box for a light fixture. The junction box is configured to be mounted to a desired surface within an environment and includes a housing, a bracket coupled to the housing, an internal cavity defined by the housing and the bracket, a driver disposed in the internal cavity, an adapter removably disposed within the internal cavity, and a cover removably coupled to the adapter to selectively close the internal cavity. The cover includes an opening configured to receive a portion of the light fixture to removably couple the light fixture to the junction box. When the cover is coupled to the adapter, the adapter retains the driver in the cavity and prevents access to the driver, and when the cover is removed, the adapter is removable from the cavity, thereby permitting access to the driver.

20 Claims, 10 Drawing Sheets

JUNCTION BOX FOR A LIGHT FIXTURE

FIELD OF DISCLOSURE

The present disclosure generally relates to light fixtures, and more particularly, a junction box for a light fixture.

BACKGROUND

Residential buildings, commercial buildings, and industrial buildings are equipped with lighting systems that typically include several light fixtures configured to illuminate certain environments. In many cases, these light fixtures, which are installed in a ceiling or a wall, are recessed so as to provide the effect of light shining through a hole in the ceiling or the wall.

SUMMARY

One aspect of the present disclosure provides a junction box for a light fixture. The junction box is configured to be mounted to a desired surface within an environment and includes a housing, a bracket coupled to the housing, an internal cavity defined by the housing and the bracket, a driver disposed in the internal cavity, an adapter removably disposed within the internal cavity, and a cover removably coupled to the adapter to selectively close the internal cavity. The cover includes an opening configured to receive a portion of the light fixture to removably couple the light fixture to the junction box. When the cover is coupled to the adapter, the adapter retains the driver in the cavity and prevents access to the driver, and when the cover is removed, the adapter is removable from the cavity, thereby permitting access to the driver.

Another aspect of the present disclosure provides a junction box for a light fixture. The junction box is configured to be mounted to a desired surface within an environment and includes a housing, a bracket coupled to the housing, an internal cavity defined by the housing and the bracket, a driver disposed in the internal cavity, an adapter removably disposed within the internal cavity, a cover removably coupled to the adapter to selectively close the internal cavity, and a stem bracket coupled to the bracket to restrict rotation of the adapter. The stem bracket includes a slot configured to receive and retain an end of the light fixture to removably couple the light fixture to the junction box. When the cover is coupled to the adapter, the adapter retains the driver in the cavity and prevents access to the driver, and when the cover is removed, the adapter is removable from the cavity, thereby permitting access to the driver.

Another aspect of the present disclosure provides a junction box for a light fixture. The junction box is configured to be mounted to a desired surface within an environment and includes a housing, a bracket coupled to the housing, an internal cavity defined by the housing and the bracket, a driver disposed in the internal cavity, an adapter removably disposed within the internal cavity, a cover removably coupled to the adapter to selectively close the internal cavity, the cover including an opening configured to receive a portion of the light fixture to removably couple the light fixture to the junction box, and a gripping element disposed outside of the internal cavity, wherein the gripping element is movable relative to the housing in order to engage a portion of the desired surface within the environment. When the cover is coupled to the adapter, the adapter retains the driver in the cavity and prevents access to the driver, and when the cover is removed, the adapter is removable from the cavity, thereby permitting access to the driver.

DETAILED DESCRIPTION

The present disclosure is generally directed to a junction box for a light fixture. The junction box can be used for both remodel and new construction applications and creates the illusion of no canopy on the light fixture. When installed, the junction box maintains the horizontal or vertical light fixture alignment. At the same time, the junction box has a cover that when employed receives and retains the light fixture and sits flush with the surface on which the junction box is installed, but can be removed in order to facilitate access to the internal components of the junction box (e.g., the driver disposed in the junction box).

Figure 1:
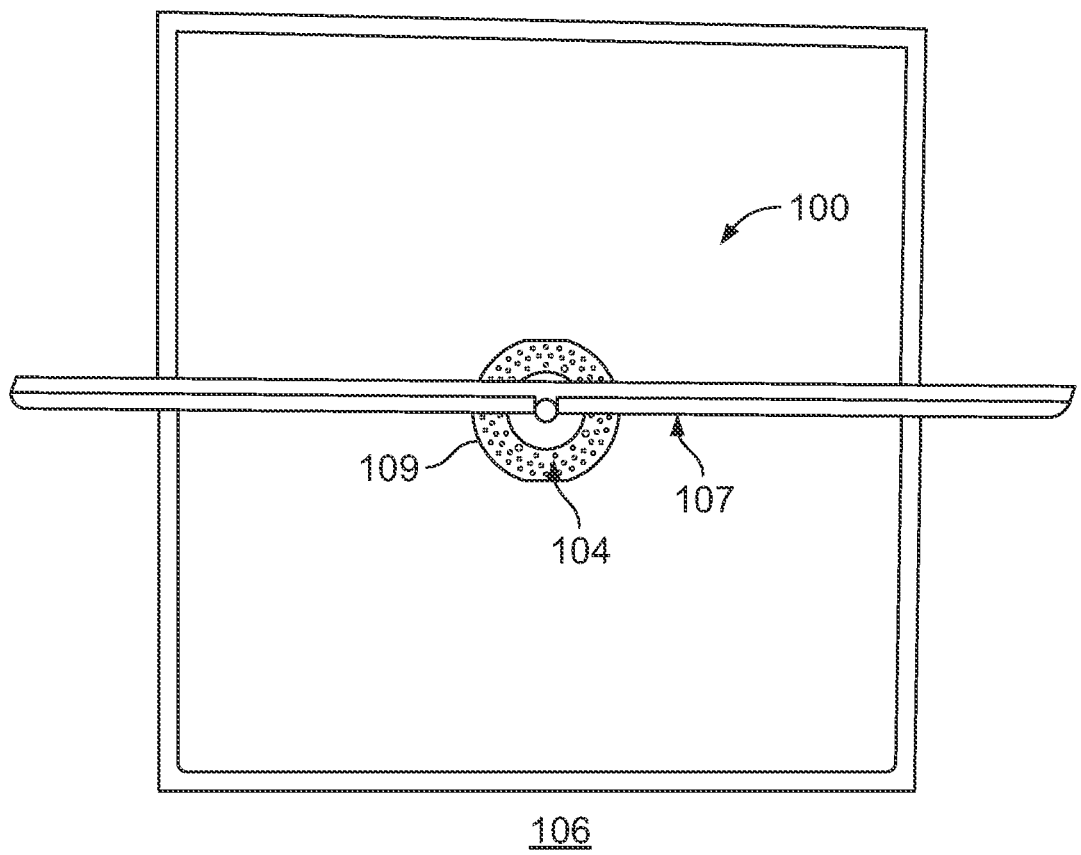
FIG. 1 is a perspective view of a first example of a light fixture having a junction box constructed in accordance with the principles of the present disclosure and installed within a hole formed in a desired surface.
Figure 2:
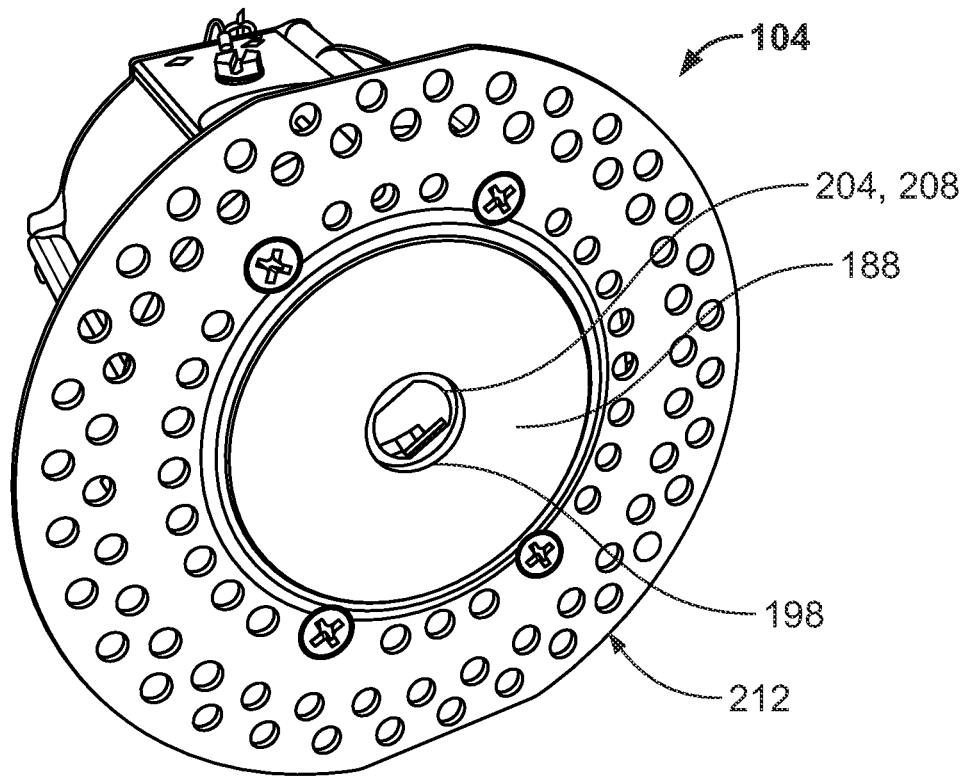
FIG. 2 is a perspective view of the junction box of FIG. 1.
Figure 3:
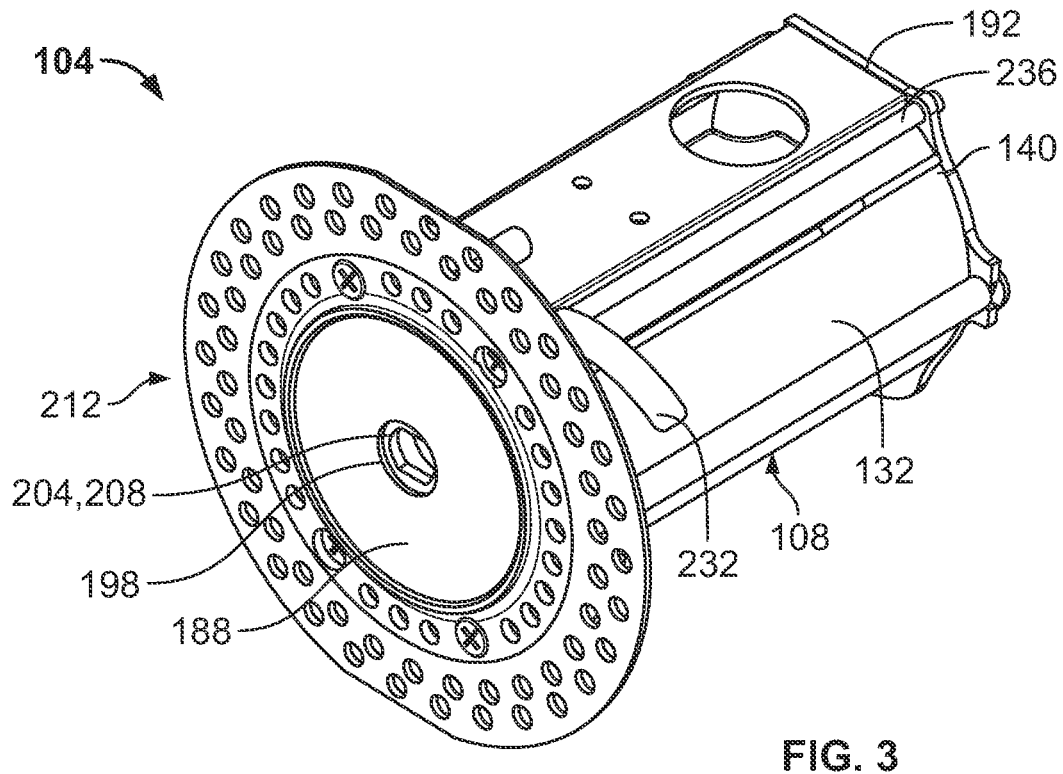
FIG. 3 is another perspective view of the junction box of FIG. 1.

FIGS. 1-7 depict one example of a light fixture 100 having a junction box 104 constructed in accordance with the principles of the present disclosure. The light fixture 100 is generally configured to be mounted on a desired surface (e.g., a ceiling, a wall) within an environment 106, such as, for example, a house, an apartment, a townhouse, a condominium, an office, or other space or building, or portions thereof, and includes a lighting element 107 that is electrically and removably connected to the junction box 104 and in turn configured to illuminate the environment 106. In this example, the lighting element 107 takes the form of a horizontal picture light, but the lighting element 107 can instead take the form of a bath bar light or other lighting element. The junction box 104 is configured to be disposed in a hole 109 formed in the desired surface, such that the rest of the light fixture 100 is visible in a manner that creates the illusion of no canopy on the light fixture 100. At the same time, as illustrated in FIG. 1, the junction box 104 maintains the vertical or horizontal alignment of the light fixture 100, as desired. While not illustrated herein, it will be appreciated that the light fixture 100 can optionally also include a heat sink, a controller, one or more diffusers, and/or one or more other components.

Figure 4:
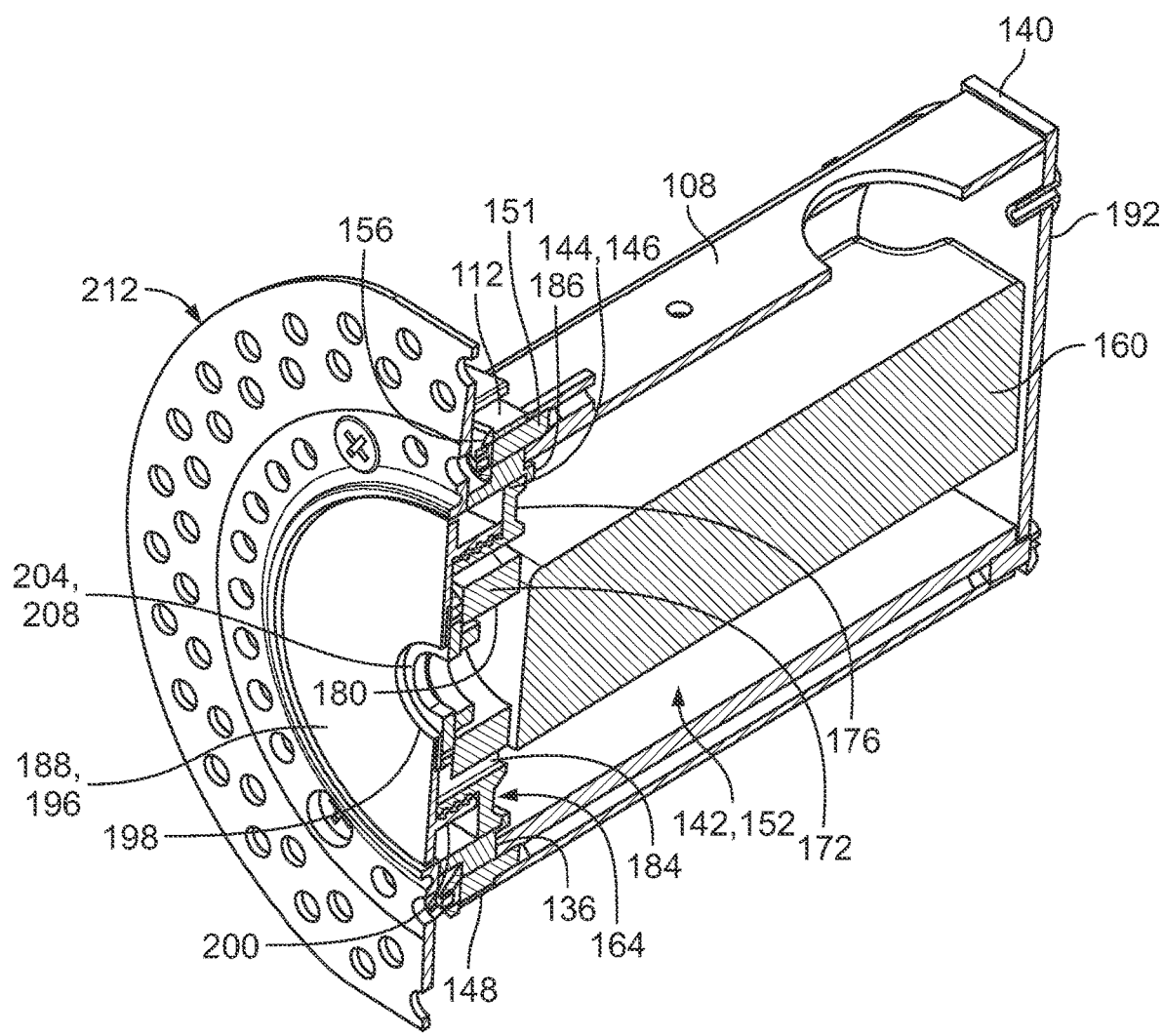
FIG. 4 is a partial, cross-sectional view of FIG. 3.

The junction box 104 generally includes a housing 108 and a bracket 112 coupled to the housing 108. The housing 108 generally serves to house and protect the components of the junction box 104. In this example, the housing 108 has a substantially cylindrical shape defined by a substantially cylindrical wall 132 that extends between a first, open end 136 and a second, open end 140 opposite the first, open end 136 and defines a central opening 142. In other examples, however, the housing 108 can have a different shape. For example, the housing 108 can instead have a spherical, cubical, conical, or other shape. As best illustrated in FIG. 4, the bracket 112 is coupled to the housing 108, and, more particularly, to the first, open end 136 of the housing 108. In this example, the bracket 112 has a substantially annular shape defined by a cylindrical wall 144 that defines a central opening 146, and a flange 148 that extends radially outward from the cylindrical wall 144 and is seated against the first, open end 136 when the bracket 112 is coupled to the housing 108. In this example, the bracket 112 is coupled to the housing 108 via a plurality of fasteners 151 extending through respective apertures 156 formed in the flange 148 of the bracket 112 and respective apertures formed in the cylindrical wall 132 of the housing 108. In other examples, however, the bracket 112 can have a different shape, can be coupled to a different portion of the housing 108, or be coupled to the housing 108 in a different manner. For example, the bracket 112 can instead be integrally formed with the housing 108. In any event, when the bracket 112 is coupled to the housing 108, an interior cavity 152 is formed or defined by the housing 108 and the bracket 112 (both of which are hollow). More particularly, the interior cavity 152 is formed or defined by the central opening 142 of the housing 108 and the central opening 146 of the bracket 112. Because in this example the housing 108 has a substantially cylindrical shape and the bracket 112 has a substantially annular shape, the interior cavity 152 in this example also has a substantially cylindrical shape.

The junction box 104 also generally includes a driver 160 and an adapter 164. The driver 160 is configured to power the components of the light fixture 100 as well as various electrical terminals and wiring (e.g., the wire 168 shown in FIG. 6) for connecting the different components of the light fixture 100. The driver 160, the electrical terminals, and the wiring are all disposed within the interior cavity 152, such that the driver 160, the electrical terminals, and the wiring are protected from the environment 104 by the housing 108. In this example, the interior cavity 152 is sized to house drivers having a maximum diameter of 2 and a maximum length of 3.44 such that the driver 160 has a diameter and length equal to or less than this maximum diameter and maximum length, with the driver 160 oriented as illustrated in FIGS. 4 and 6.

Figure 5:
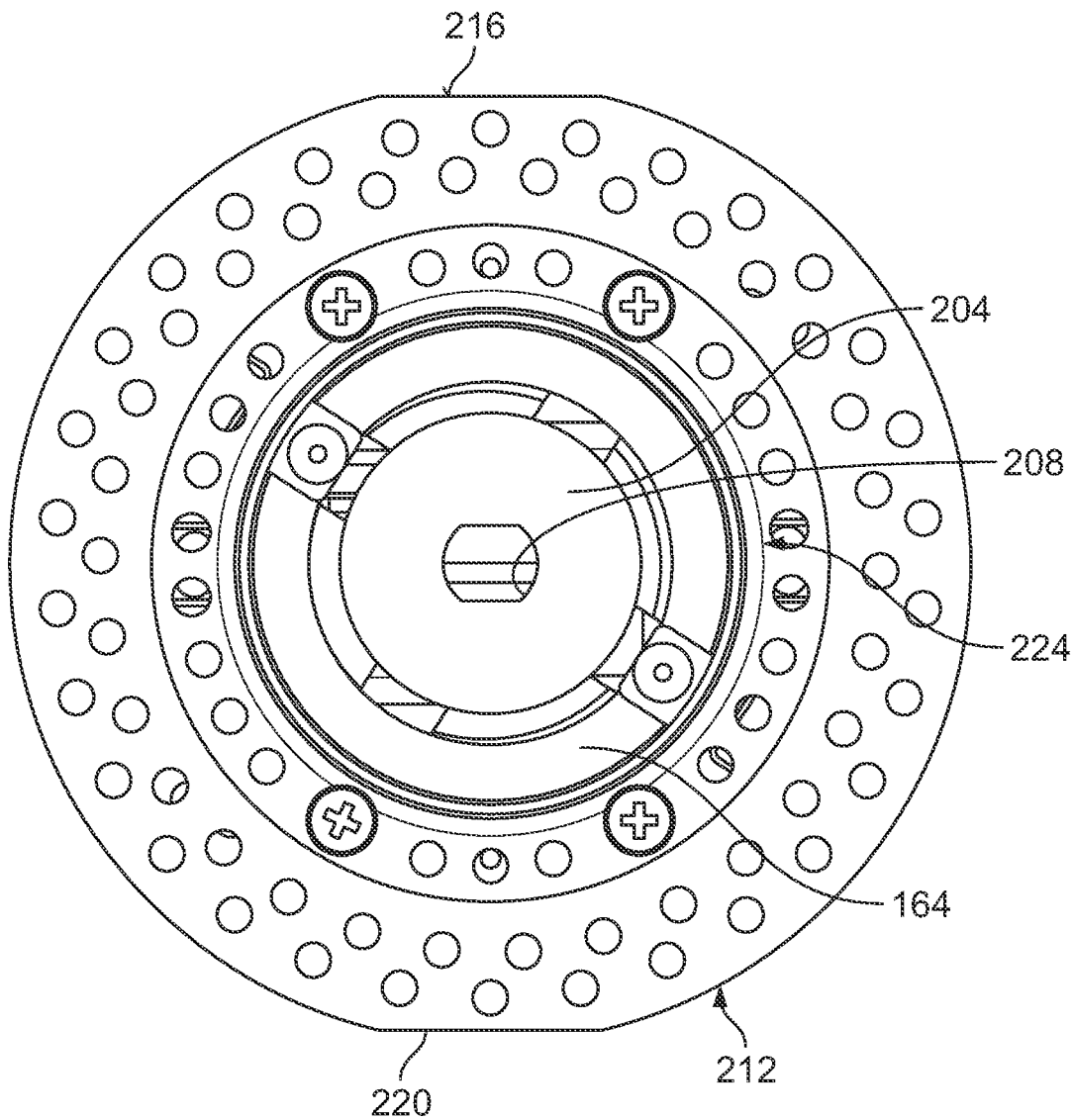
FIG. 5 is a top view of the junction box of FIG. 1 but with a first cover of the junction box removed.

Meanwhile, the adapter 164 is removably disposed within the interior cavity 152 in order to selectively block or permit access to the rest of the interior cavity 152 and, more particularly, to the driver 160 and the other components disposed within the interior cavity 152. As best illustrated in FIGS. 4-6, the adapter 164 in this example has a substantially annular shape defined by a cylindrical neck 172 and a flange 176 that extends radially outward from the cylindrical neck 172. The adapter 164 also includes a central opening 180 that extends through the cylindrical neck 172, such that the central opening 180 is arranged to help route wiring between the lighting element 107 and the driver 160. The adapter 164 in this example also includes a plurality of openings (four in this case) that circumscribe the central opening 180, as best illustrated in FIG. 5. The adapter 164 in this example further includes an annular channel 184 that is formed in cylindrical neck 172 at a position radially outward of the central opening 180, such that the annular channel 184 surrounds the central opening 180.

Figure 6:
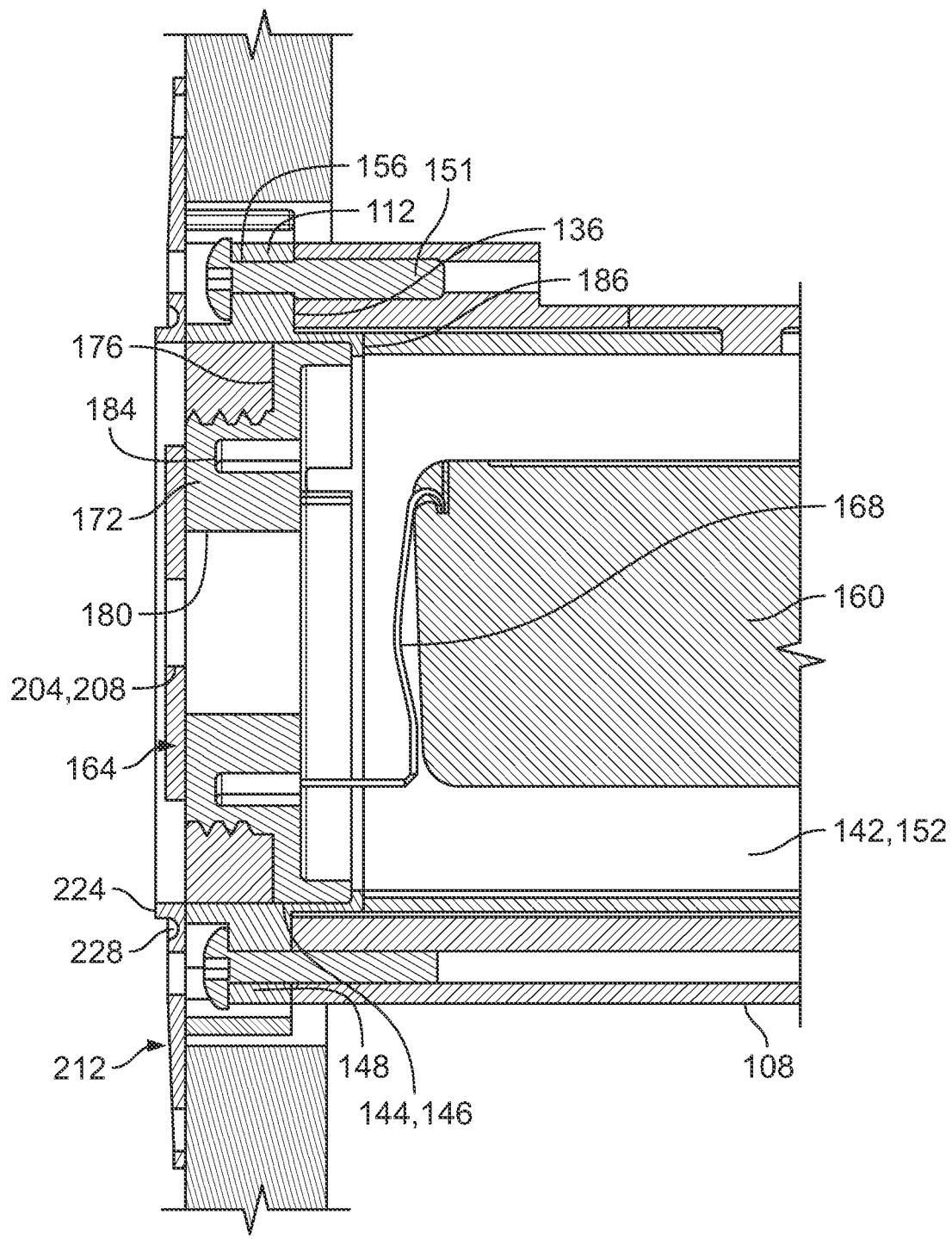
FIG. 6 is a cross-sectional view of the junction box of FIG. 1.
Figure 7:
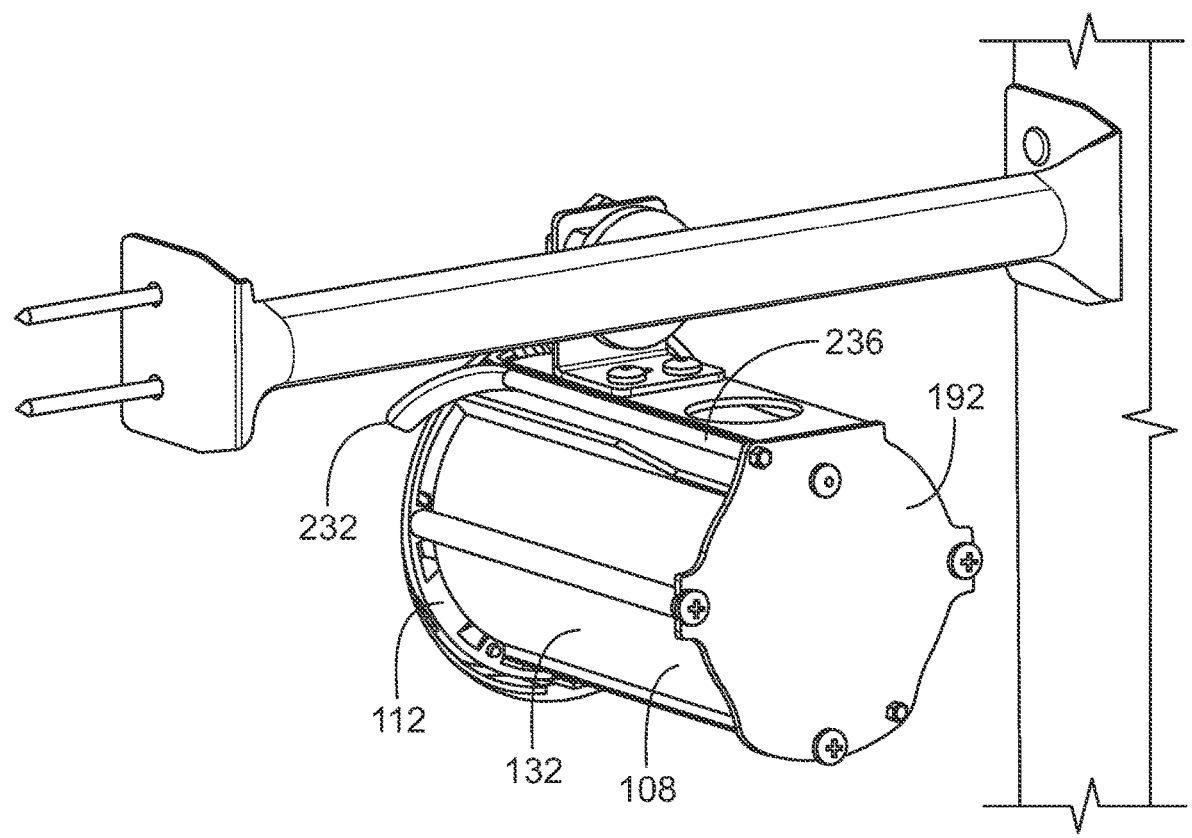
FIG. 7 is another perspective view showing the junction box of FIG. 1 from within the hole formed in the desired surface.
Figure 8:
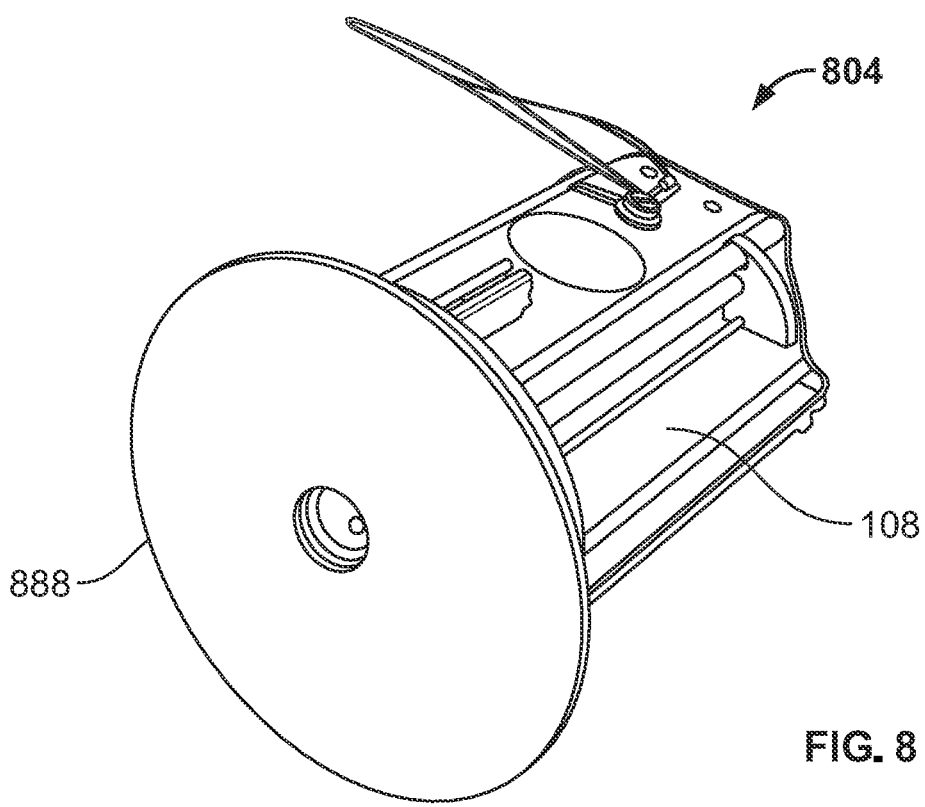
FIG. 8 is a perspective view of a second example of a light fixture having a junction box constructed in accordance with the principles of the present disclosure.
Figure 9:
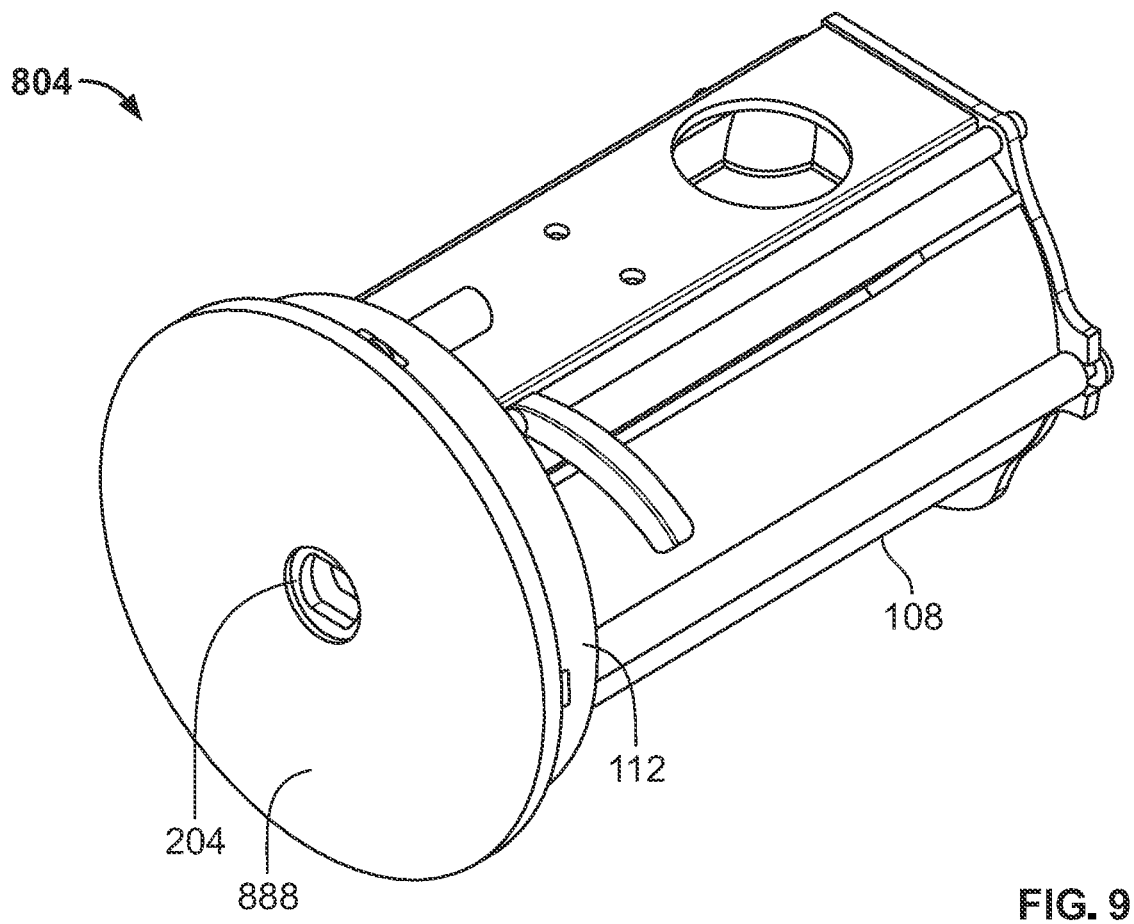
FIG. 9 is another perspective view of the junction box of FIG. 8.
Figure 10:
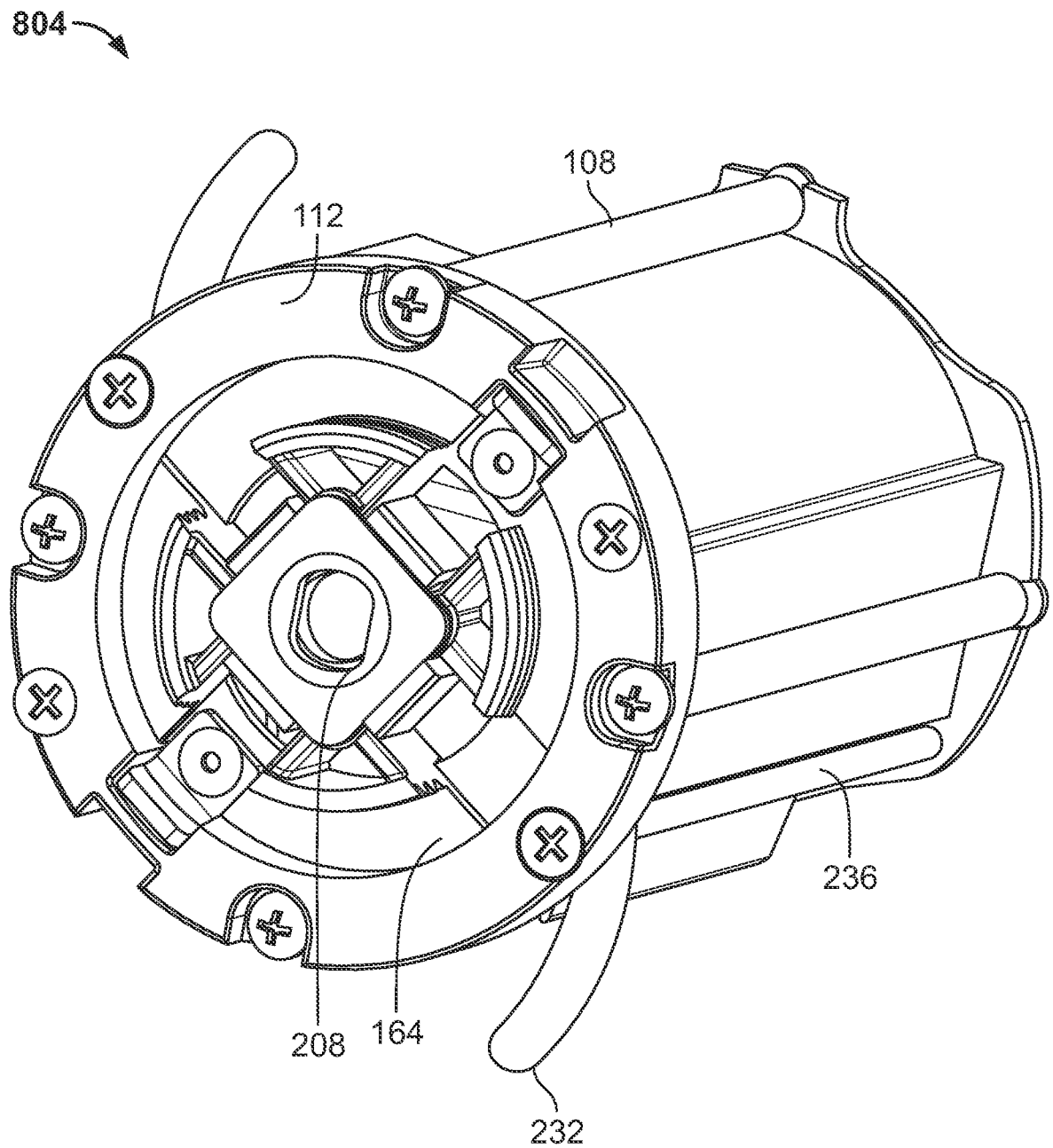
FIG. 10 is another perspective view of the junction box of FIG. 8 but with a first cover of the junction box removed.
Figure 11:
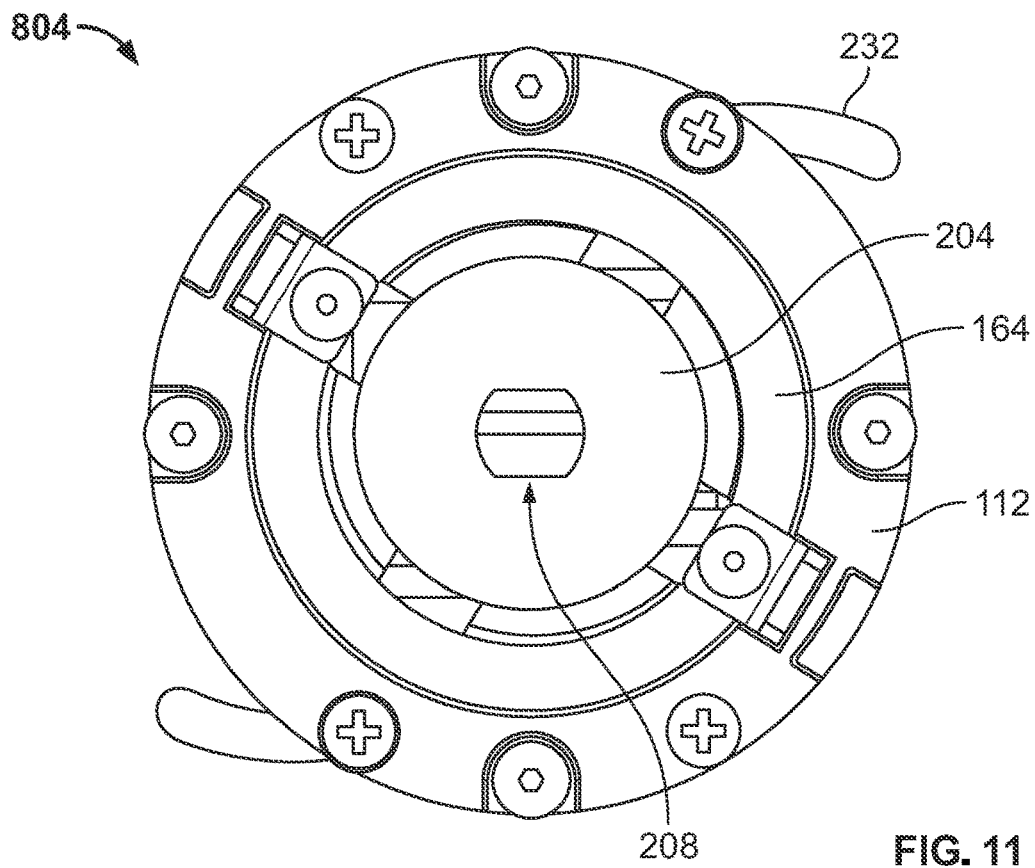
FIG. 11 is a top view of the junction box of FIG. 10.
Figure 12:
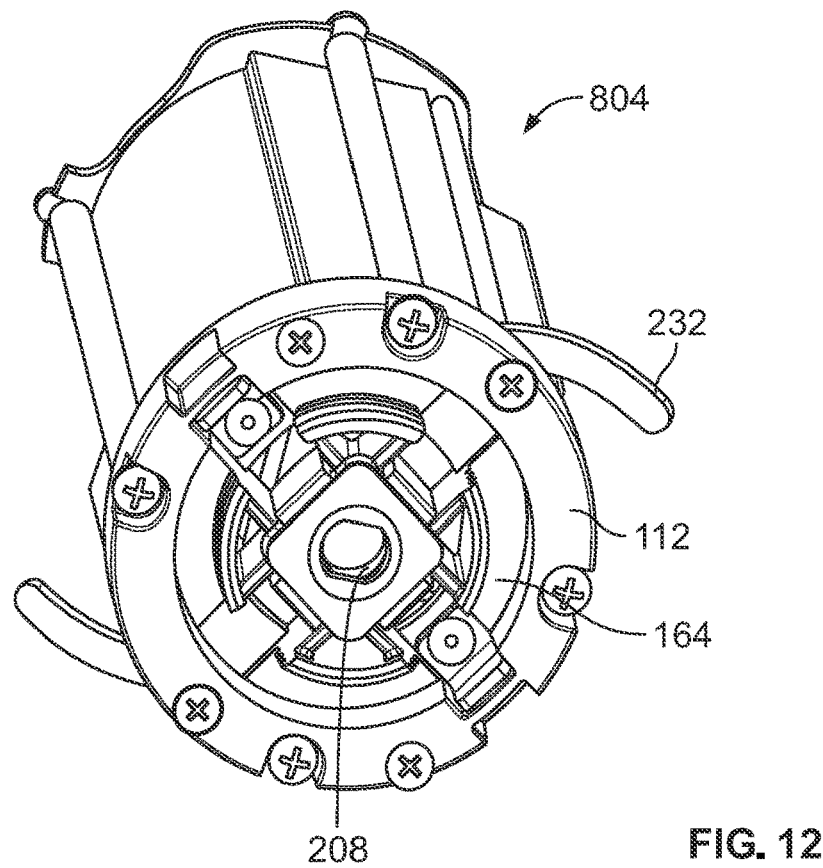
FIG. 12 is another perspective view of the junction box of FIG. 8.
Figure 13:
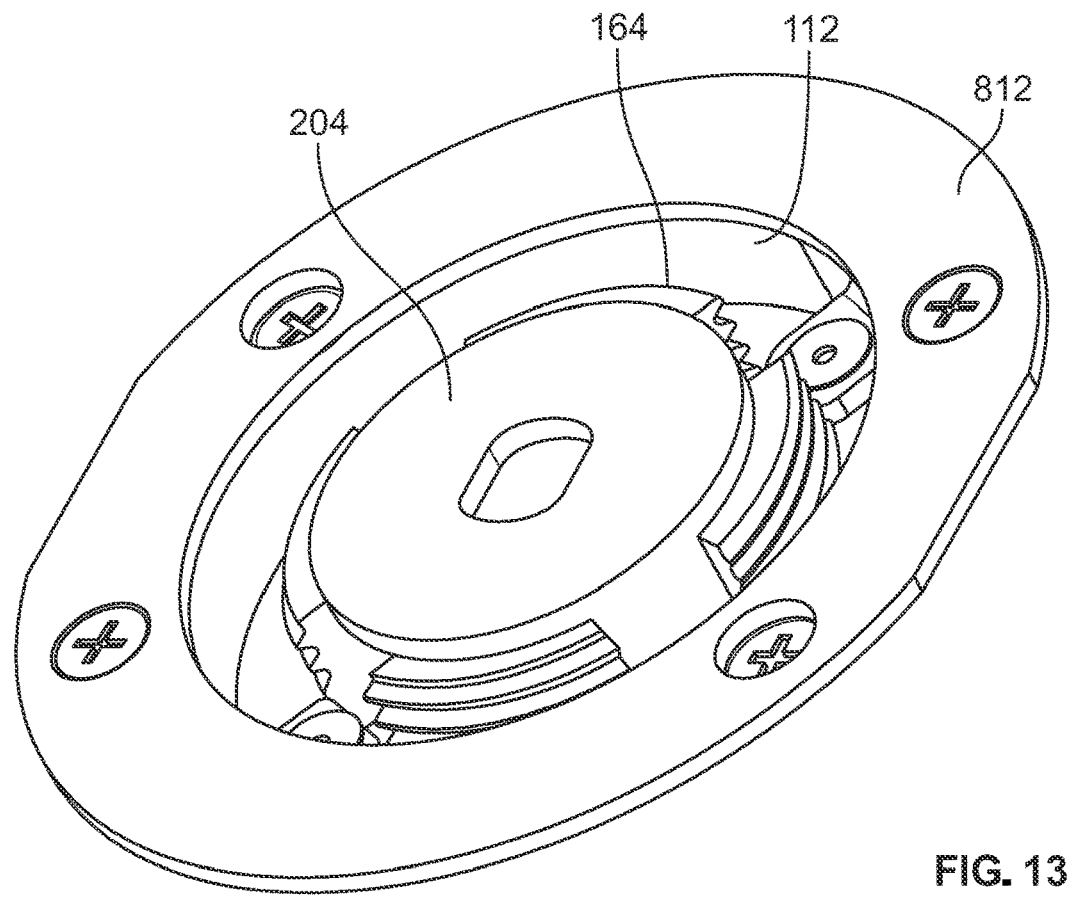
FIG. 13 is a close-up view of the junction box of FIG. 8 but with the first cover of the junction box removed.
Figure 14:
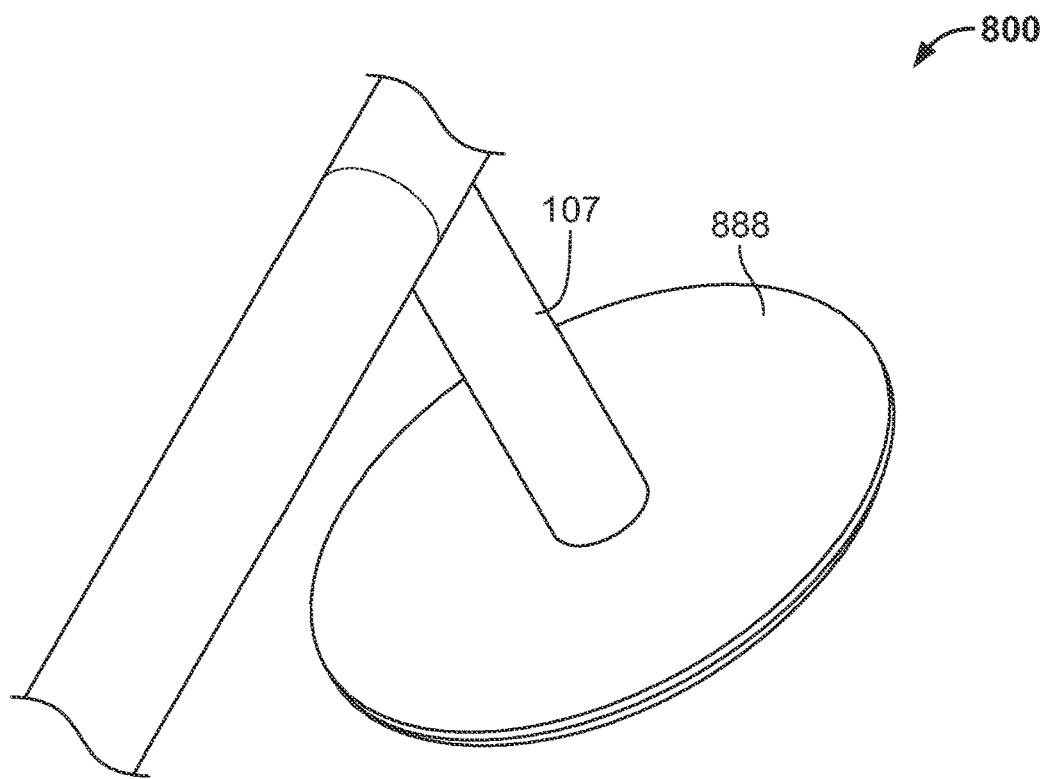
FIG. 14 shows the light fixture and the first cover of the junction box of FIG. 8.

As best illustrated in FIG. 6, the adapter 164 is removably disposed within the interior cavity 152 at or immediately adjacent the first, open end 136 of the housing 108. More particularly, the adapter 164 is removably seated against a seating surface 186 of the bracket 112 that extends radially inward from an end of the cylindrical wall 144 of the bracket 112. In this example at least, the flange 176 of the adapter 164 is removably seated against the seating surface 186, though in other examples, the adapter 164 can be removably seated against the seating surface 186 in a different manner. When the adapter 164 is seated against the seating surface 186 in this manner, the adapter 164 serves to retain the driver 160 in the interior cavity 152 (by virtue of the fact that the diameter of the driver 160 is larger than the central opening 180) and blocks access to the driver 160 and any other components disposed within the interior cavity 152. At the same time, the seating surface 186 helps to retain the adapter 164 in position within the interior cavity 152, thereby preventing the adapter 164 from falling into the interior cavity 152. Conversely, when the adapter 164 is removed from the seating surface 186 (and more generally the interior cavity 152), the adapter 164 no longer serves to retain the driver 160 in the interior cavity 152 or block access to the driver 160 and any other components disposed within the interior cavity 152.

The junction box 104 further includes a first cover 188 and a second cover 192. Both the first cover 188 and the second cover 192 are generally configured to selectively open or close the interior cavity 152, albeit on opposite ends of the junction box 104. The first cover 188 is removably coupled to the adapter 164 in order to selectively cover the first, open end 136 of the housing 108, whereas the second cover 192 is removably coupled to the housing 108 in order to selectively cover the second, open end 140 of the housing 108. In this example, the first cover 188 takes the form of an annular disk 196, a central opening 198 formed through the annular disk 196, and a circumferential wall 200 that extends outward (rightward in the orientation shown in FIG. 4) from the annular disk 196. In this example, the first cover 188 is removably coupled to the adapter 164 by virtue of a threaded engagement between a plurality of threads formed on an inner surface of the circumferential wall 200 of the first cover 188 that engage a plurality of corresponding threads formed on an outer surface of the cylindrical neck 172 of the adapter 164. In other examples, however, the first cover 188 can be removably coupled to the adapter 164 in a non-threaded manner or via threads located on different portions of the adapter 164 and the first cover 188. In any event, when the first cover 188 is coupled to the adapter 164, the first cover 188 is disposed within or just outside of the interior cavity 152, but, in either case, the first cover 188 retains the adapter 164 within the interior cavity 152 by pushing or holding the adapter 164 into engagement against the seating surface 186 of the bracket 112. At the same time, the lighting element 107 can be coupled to the first cover 188 by inserting a stem (or pipe) of the lighting element 107 into the central opening 198. Conversely, when the lighting element 107 is decoupled from the first cover 188 and when the first cover 188 is decoupled from the adapter 164, the adapter 164 is no longer retained in position by the first cover 188, such that the adapter 164 can be removed from the interior cavity 152 as discussed above.

Preferably, the junction box 104 also includes a stem bracket 204 that is configured to receive and retain the stem of the lighting element 107 therein to secure the lighting element 107 to the junction box 104. In this example, the stem bracket 204 is coupled to the bracket 112 via a plurality of fasteners and by disposing a plurality of legs (four in this case) of the guide bracket 204 into the plurality of openings of the adapter 164 that circumscribe the central opening 180. It will be appreciated that by coupling the stem bracket 204 to the bracket 112 and to the adapter 164 in this manner, the stem bracket 204 serves to restrict rotation of the adapter 164. Moreover, the guide bracket 204 has a slot 208 configured to receive and retain the stem of the lighting element 107 therein when the stem of the lighting element 107 is inserted into the central opening 198 of the first cover 188 and secured in place with a nut on the opposite side of the insertion, thereby locking the stem of the lighting element 107 in place. In this example, the slot 208 has a double d shape, such that the slot 208 is configured to receive and retain the lighting element 107 therein when the stem of the lighting element 107 also has a double d shape. In other examples, however, the slot 208 can have a different shape, e.g., a circular or a rectangular shape. In this example, the stem bracket 204 is positioned on an underside of the first cover 188. Thus, when the first cover 188 is coupled to the adapter 164, the stem bracket 204 is at least partially arranged between the adapter 164 and the first cover 188, with the slot 208 coaxially aligned with the central opening 180 of the adapter 164 and the central opening 198 of the first cover 188.

Further yet, the junction box 104 in this example includes a mud plate 212 (which can alternatively be referred to as a plaster plate). The mud plate 212 generally facilitates the installation of the light fixture 100 on the desired surface within the environment 106. In this example, the mud plate 212 is coupled to the bracket 112 such that the mud plate 212 surrounds the first cover 188 and the mud plate 212 is substantially flush with the first cover 188. In order to mount the light fixture 100 on the desired surface, the junction box 104 is substantially disposed in the hole 109 formed in the desired surface, and the mud plate 212, which in turn engages the desired surface, can be covered by plaster (or another suitable material). Accordingly, the mud plate 212 is sandwiched between the plaster (or other suitable material) and the desired surface (as well as the junction box 104), such that the mud plate 212 is no longer visible. At the same time, the first cover 188 is exposed and the lighting element 107 extends into the environment 106, such that the lighting element 107 and the first cover 188 can be decoupled as is necessary (e.g., to access the driver 160 and/or one or more other components of the junction box 104). As an example, the lighting element 107 and the first cover 188 can be decoupled, allowing the adapter 164 to be removed, and, in turn, allowing the driver 160 to be removed from the interior cavity 152.

Moreover, the mud plate 212 in this example has several beneficial features that help to facilitate the desired mounting. First, as best illustrated in FIG. 5, the mud plate 212 has a flat, top edge 216 and a flat, bottom edge 220 opposite the flat, top edge 216. Together, the flat, top and bottom edges 216, 220 help with proper alignment of the mud plate 212 (and the light fixture 100) during the installation. Second, as best illustrated in FIGS. 5 and 6, the mud plate 212 tapers gradually as it extends radially outward, away from the central opening 198. This long taper helps to blend the mud plate 212 (and the plaster) with the desired surface. Third, as also best illustrated in FIGS. 5 and 6, the mud plate 212 has an extruded lip 224 and a valley 228 defined between the extruded lip 224 and the tapered portion of the mud plate 212. The extruded lip 224 and the valley 228 cooperate to help retain the plaster (or other suitable material) and to provide a flush stopping point.

Optionally, the mud plate 212 in this example also includes a gripping element 232 that also helps to facilitate the desired mounting. In particular, the gripping element 232, which is disposed outside of the internal cavity 152 (and more generally outside the housing 108), is configured to selectively engage a portion of the desired surface in order to help secure the junction box 104 (and the light fixture 100 more generally) to the desired surface after the junction box 104 has been disposed in the hole 109. In this example, the gripping element 232 takes the form of a gripping foot that is movable, relative to the mud plate 212, by adjusting a fastener 236 that connects the mud plate 212. As an example, rotation of the fastener 236 in a first direction (e.g., a clockwise direction) moves the gripping element 232 closer to the mud plate 212, whereas rotation of the fastener 236 in a second direction opposite the first direction moves the gripping element 232 away from the mud plate 212.

FIGS. 8-14 depict another example of a light fixture 800 having a junction box 804 constructed in accordance with the principles of the present disclosure. The light fixture 800 and the junction box 804 are structurally and functionally similar to the light fixture 100 and the junction box 104, respectively, with common components depicted using common reference numerals, but for two main differences. First, the junction box 804 does not include a mud plate (e.g., the mud plate 212). Instead, the junction box 804 includes an annular flange plate 812 that is coupled to the bracket 112 and surrounds the adapter 164 and the stem bracket 204. Second, because the junction box 804 does not include a mud plate, the junction box 804 has a first cover 888 that is larger than the first cover 188 in order to selectively cover the annular flange 812.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A junction box for a light fixture, the junction box configured to be mounted to a desired surface within an environment and comprising:
   a housing;
   a bracket coupled to the housing;
   an internal cavity defined by the housing and the bracket;
   a driver disposed in the internal cavity;
   an adapter removably disposed within the internal cavity; and
   a cover removably coupled to the adapter to selectively close the internal cavity, the cover comprising an opening configured to receive a portion of the light fixture to removably couple the light fixture to the junction box;
   wherein when the cover is coupled to the adapter, the adapter retains the driver in the cavity and prevents access to the driver, wherein when the cover is removed, the adapter is removable from the cavity, thereby permitting access to the driver, wherein the bracket has a seating surface, and wherein when the cover is coupled to the adapter, the adapter is removably seated against the seating surface.

2. The junction box of claim 1, wherein the bracket is coupled to a first end of the housing, further comprising a second cover coupled to a second end of the housing.

3. The junction box of claim 1, wherein the cover has a plurality of threads configured to removably engage a plurality of threads of the adapter.

4. The junction box of claim 1, further comprising a stem bracket coupled to the bracket, the stem bracket comprising a slot configured to receive and retain an end of the light fixture to removably couple the light fixture to the junction box.

5. The junction box of claim 1, further comprising a gripping element disposed outside of the internal cavity, wherein the gripping element is movable relative to the housing in order to engage a portion of the desired surface within the environment.

6. The junction box of claim 1, further comprising a mud plate coupled to the bracket.

7. The junction box of claim 1, further comprising a flange plate coupled to the bracket.

8. The junction box of claim 1, wherein the housing has a first end and a second end opposite the first end, and wherein the bracket comprises a flange seated against the first end of the housing.

9. A junction box for a light fixture, the junction box configured to be mounted to a desired surface within an environment and comprising:
- a housing;
- a bracket coupled to the housing;
- an internal cavity defined by the housing and the bracket;
- a driver disposed in the internal cavity;
- an adapter removably disposed within the internal cavity;
- a cover removably coupled to the adapter to selectively close the internal cavity; and
- a stem bracket coupled to the bracket to restrict rotation of the adapter, the stem bracket comprising a slot configured to receive and retain an end of the light fixture to removably couple the light fixture to the junction box, wherein the stem bracket is disposed between the cover and the adapter, wherein when the cover is coupled to the adapter, the adapter retains the driver in the cavity and prevents access to the driver, and wherein when the cover is removed, the adapter is removable from the cavity, thereby permitting access to the driver.

10. The junction box of claim 9, wherein the bracket is coupled to a first end of the housing, further comprising a second cover coupled to a second end of the housing.

11. The junction box of claim 9, wherein the cover has a plurality of threads configured to removably engage a plurality of threads of the adapter.

12. The junction box of claim 9, wherein the bracket has a seating surface, and wherein when the cover is coupled to the adapter, the adapter is removably seated against the seating surface.

13. The junction box of claim 9, further comprising a gripping element disposed outside of the internal cavity, wherein the gripping element is movable relative to the housing in order to engage a portion of the desired surface within the environment.

14. The junction box of claim 9, further comprising a mud plate coupled to the bracket.

15. The junction box of claim 9, further comprising a flange plate coupled to the bracket.

16. The junction box of claim 9, wherein the stem bracket comprises one or more legs disposed in one or more openings, respectively, formed in the adapter to restrict rotation of the adapter.

17. A junction box for a light fixture, the junction box configured to be mounted to a desired surface within an environment and comprising:
- a housing;
- a bracket coupled to the housing;
- an internal cavity defined by the housing and the bracket;
- a driver disposed in the internal cavity;
- an adapter removably disposed within the internal cavity;
- a cover removably coupled to the adapter to selectively close the internal cavity, the cover comprising an opening configured to receive a portion of the light fixture to removably couple the light fixture to the junction box; and
- a gripping element disposed outside of the internal cavity, wherein the gripping element is movable relative to the housing and the bracket in order to engage a portion of the desired surface within the environment, wherein when the cover is coupled to the adapter, the adapter retains the driver in the cavity and prevents access to the driver, and wherein when the cover is removed, the adapter is removable from the cavity, thereby permitting access to the driver.

18. The junction box of claim 17, wherein the cover has a plurality of threads configured to removably engage a plurality of threads of the adapter.

19. The junction box of claim 17, further comprising a stem bracket coupled to the bracket, the stem bracket comprising a slot configured to receive and retain an end of the light fixture to removably couple the light fixture to the junction box.

20. The junction box of claim 17, wherein the bracket has a seating surface, and wherein when the cover is coupled to the adapter, the adapter is removably seated against the seating surface.

* * * * *